United States Patent [19]

Ensminger et al.

[11] Patent Number: 4,872,306

[45] Date of Patent: Oct. 10, 1989

[54] METHOD OF FABRICATING CHAIN MESH AND CHAIN MESH FABRICATED THEREBY

[75] Inventors: Gerald H. Ensminger, Dallastown; Andrzej Kalazny, Wyomissing, both of Pa.

[73] Assignee: Cooper Industries, Inc., Houston, Tex.

[21] Appl. No.: 159,385

[22] Filed: Feb. 23, 1988

Related U.S. Application Data

[62] Division of Ser. No. 77,623, Jul. 24, 1987.

[51] Int. Cl.[4] .............................................. F16G 13/12

[52] U.S. Cl. ........................................... 59/78; 59/93; 245/4; 245/5; 198/849; 152/231

[58] Field of Search ...................... 59/78, 93; 245/4, 5; 152/231, 239, 242; 29/469, 450, 437; 198/848, 849

[56] References Cited

U.S. PATENT DOCUMENTS

| | | | |
|---|---|---|---|
| 911,427 | 2/1909 | Morehouse | 245/4 |
| 1,608,054 | 11/1926 | Brighton | 182/196 |
| 2,342,455 | 2/1944 | Dahlander | 182/196 |
| 2,343,123 | 2/1944 | Dahlander | 245/4 |
| 2,722,359 | 11/1955 | Craft | 182/196 |
| 3,127,635 | 4/1964 | Schmidt et al. | 198/849 |
| 4,361,178 | 11/1982 | Gower | 152/239 |
| 4,660,611 | 4/1987 | Gockley et al. | 152/231 |
| 4,673,015 | 6/1987 | Andresson | 245/4 |

*Primary Examiner*—David Jones
*Attorney, Agent, or Firm*—Shoemaker and Mattare, Ltd.

[57] ABSTRACT

A chain mesh for easy installation comprises a plurality of running lengths of chain. In one embodiment a plurality of vertical running lengths are positioned in parallel spaced relationship. A plurality of substantially horizontal running lengths are then positioned closely adjacent the plurality of vertical running lengths, and then the points of crossing are interconnected by connecting links therebetween. Each connecting link is normally open, and then closed after being installed between a respective vertical link and a close horizontal link. The connecting links permit a flexibility between the vertical and the horizontal chains, but substantially retain the cross parallel chains in such relationship. This crossed relationship may have the respective plurality of chains substantially perpendicular to each other, or they may be at an oblique angle to each other.

2 Claims, 4 Drawing Sheets

METHOD OF FABRICATING CHAIN MESH AND CHAIN MESH FABRICATED THEREBY

This is a division of application Ser. No. 077,623, filed July 24, 1987.

BACKGROUND OF THE INVENTION

1. Field of the Invention

This invention relates in general to an improved chain mesh for use, e.g., in forming a barrier, and a method of fabricating such chain mesh.

2. Description of the Prior Art

A common problem with known chain mesh arrangements of conventional type is that typically mesh of this type has been fabricated by connecting short cross-pieces of chain between parallel running lengths of chain, the short cross-pieces forming tops and bottoms of the squares or rectangles and the running lengths forming the sides. A great disadvantage of this arrangement is that installation of same is slow, quite expensive, and generally requires that the chain mesh be fabricated away from the point of use and then transported to the job site in a completed form. Of course, such type mesh and method of installation is hard to handle, quite cumbersome, and relatively expensive to all concerned.

As used in this specification and the claims following, the term "running length of chain" refers to a substantial length of chain consisting of a plurality of individual links joined one to another.

A number of chain mesh arrangements are known, but in most cases, they fail to achieve the benefits of the present invention. Existing prior patents which may be pertinent to the present invention are as follows:

U.S. Pat. No. 4,083,090 - Apr. 11, 1978 - Duvekot
U.S. Pat. No. 2,343,123 - Feb. 29, 1944 - Dahlander
U.S. Pat. No. 1,828,304 - Oct. 20, 1931 - Woodman
U.S. Pat. No. 1,666,951 - Apr. 24, 1928 - Soderstrom
U.S. Pat. No. 1,552,269 - Sept. 1, 1925 - Brocker
U.S. Pat. No. 1,016,479 - Feb. 6, 1912 - Coyne, et al.

None of the known prior art devices offer the new and novel features of the present invention.

SUMMARY OF THE INVENTION

The present invention is for an improved method of fabrication of chain mesh that greatly facilitates on-site installation thereof and significantly lowers the cost of fabrication. Likewise, the chain mesh so fabricated is a great improvement over known type mesh.

An object of the present invention is to provide a novel method of fabricating chain mesh.

Another object of the present invention is to provide a chain mesh comprising running lengths of chain in two or more planes interconnected by connecting pieces, which may be single chain links or short lengths of chain consisting of two or more links.

Yet another object of the present invention is to provide a chain mesh comprising a plurality of parallel running lengths of chain which are arranged in substantially vertical and horizontal directions with interconnecting pieces.

In one preferred embodiment, the method comprises arranging a first series of parallel running lengths of chain; arranging a second series of running lengths of chain which are parallel to each other but not parallel to the running lengths of the first series, the first and second series being so oriented with respect to each other that each running length of the second series crosses and is adjacent to several running lengths of the first series at crossing sites; and connecting the two series at the crossing sites by means of single connecting links passing through links of running lengths of the first and second series, respectively, at such sites.

A preferred embodiment of improved chain mesh of the present invention includes chain lengths arranged in two adjacent planes. The first plane is occupied by parallel spaced running lengths of chains extending in one direction, and the second plane is occupied by parallel spaced running lengths of chains extending in a direction perpendicular or obliquely to the first direction. Preferably, single connecting links connect the chains in the first plane to those in the second plane at the points where the respective chains cross.

Preferably, each connecting link used between the first and second planes is formed with an open gap prior to installation so that said connecting link can be passed through the chain links to be connected, and which can then be closed with a suitable clinching tool after the connection has been made.

Because only running lengths of chain are used in the present invention, the necessity for using short lengths as previously done is eliminated. This significantly reduces fabrication time on the site, in that fewer connections need to be made at the points of intersection. Furthermore, by fabricating the entire mesh on-site rather than prior to delivery thereto, pre-installation time and expense is substantially reduced. It also allows the on-site workers greater flexibility and ease of installation.

Chain mesh fabricated as disclosed herein can be used for above-ground and/or above-water installations, as well as for underwater barriers and intrusion prevention devices.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
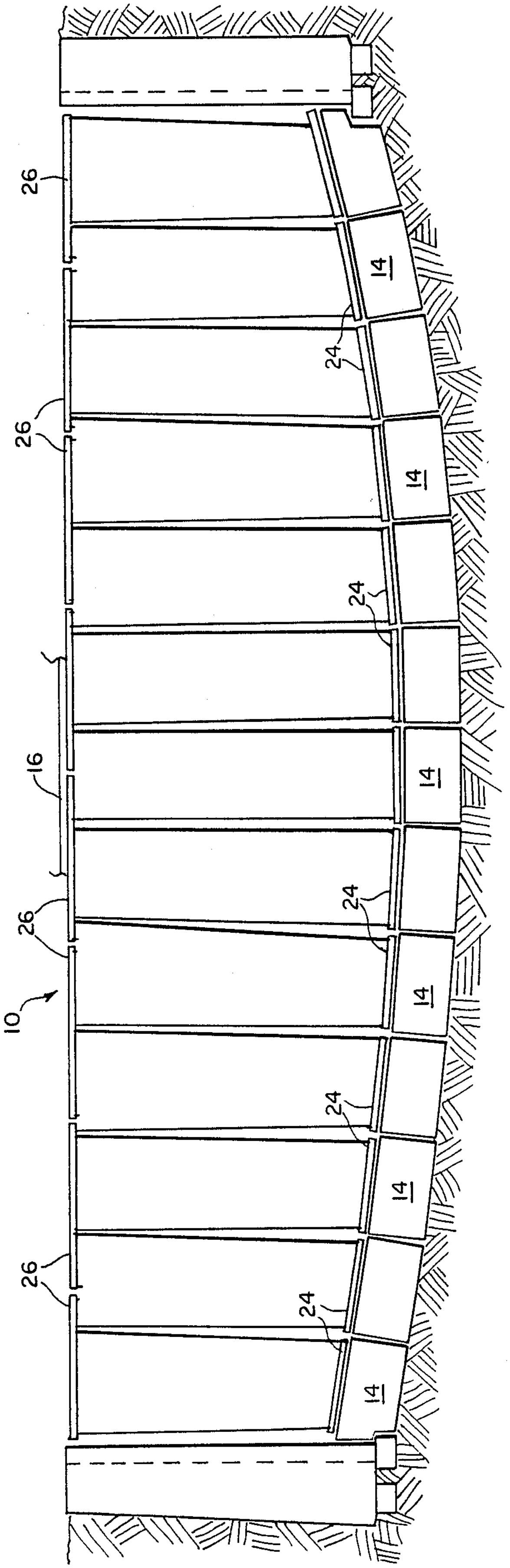
FIG. 1 is a front elevational view of an underwater barrier installation using chain mesh fabricated by the method of the present invention.
Figure 3:
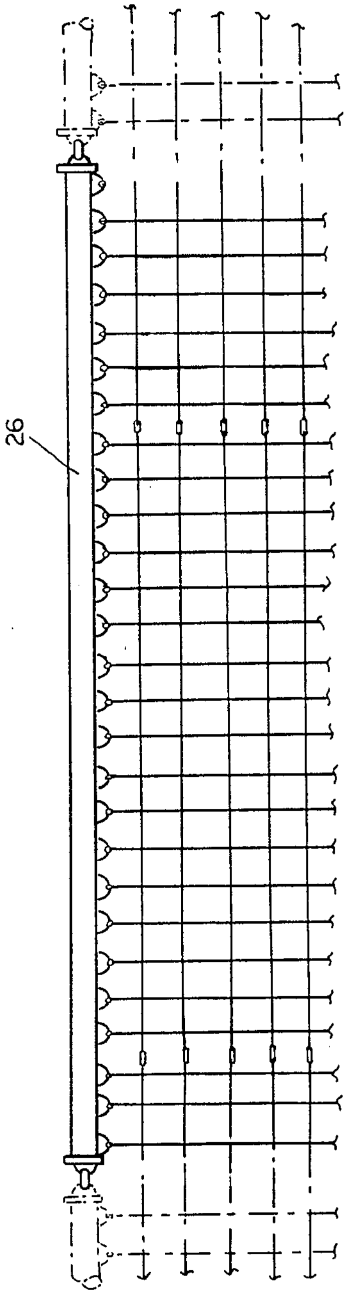
FIG. 3 is a middle portion of the top support pipe.
Figure 2:
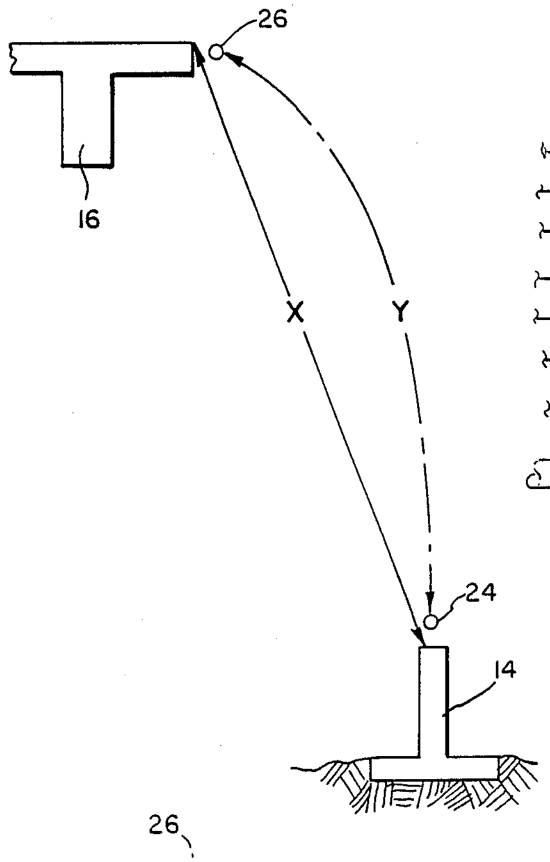
FIG. 2 is a side elevational view of the bridge and anchor members as shown in FIG. 1.
Figure 4:
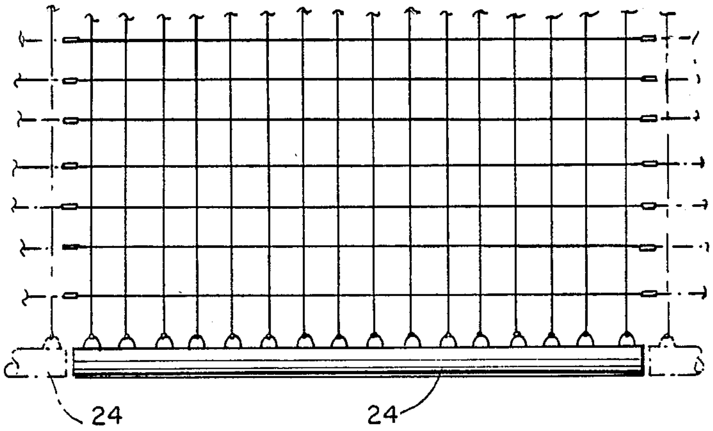
FIG. 4 is a middle portion of the bottom support pipe.
Figure 5:
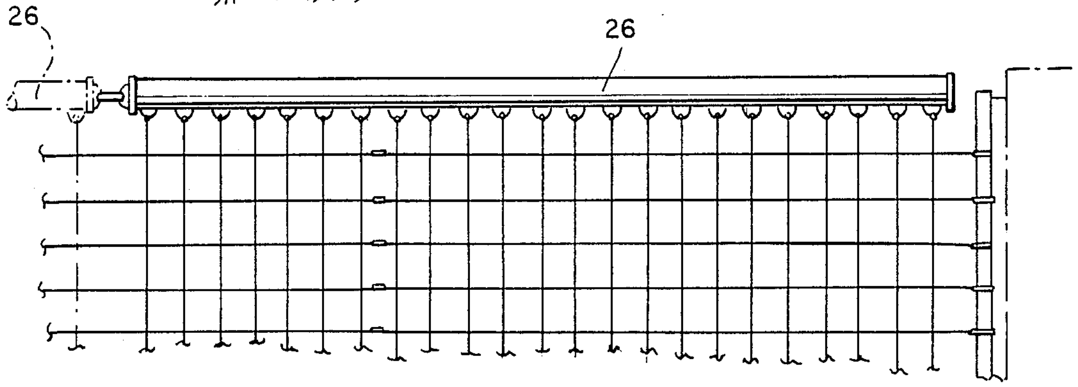
FIG. 5 shows an end section of the top support pipe.
Figure 6:
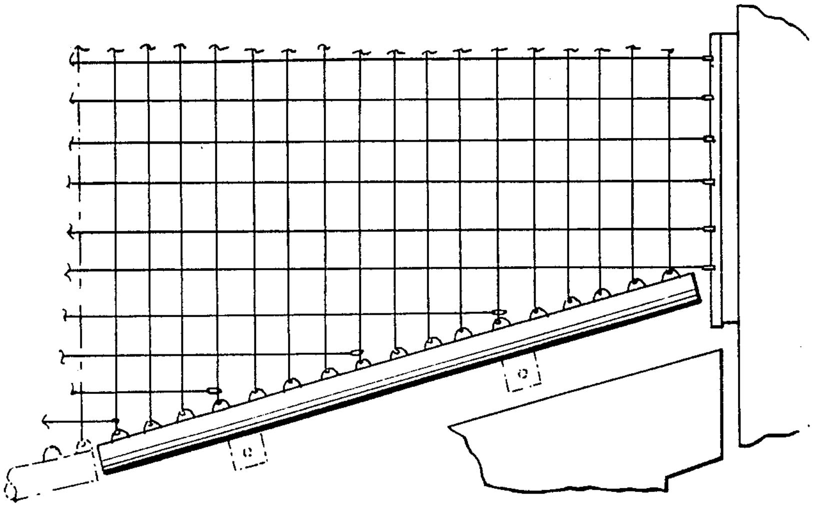
FIG. 6 shows an end section of the bottom support pipe.

Looking at FIG. 1 of the drawings, reference numeral 10 indicates the chain mesh of the present invention as installed between an upper bridge support structure and lower anchor blocks. A plurality of mesh panels 12A, 12B, 12C, etc. are provided and interconnected between bottom anchor blocks 14 and an upper bridge support structure 16, best seen in the side elevational view of FIG. 2. The plurality of anchor blocks 14 have a bottom support pipe 24 attached thereto for holding the lower ends of the plurality of vertical chains of each mesh panel 12A, 12B, etc. A top support pipe 26 is affixed to the bridge structure 16 for holding the upper ends of the plurality of vertical chains of each grid mesh panel. FIG. 3 depicts the attachment of the plurality of vertical chains to the top support pipe 26, while FIG. 4 shows the connections of the lower ends of the vertical chains to the lower support pipe 24. The showings in FIGS. 3 and 4 are for the center grid mesh panels, that is, panels 12B–12M of FIG. 1. The details of attachment and connection for the end mesh panels 12A and 12N are depicted in FIGS. 5 and 6, respectively. It should be noted that these end mesh panels 12A and 12N also have the outboard ends of the horizontal chains interconnected to side support pipes 36.

Figure 7:
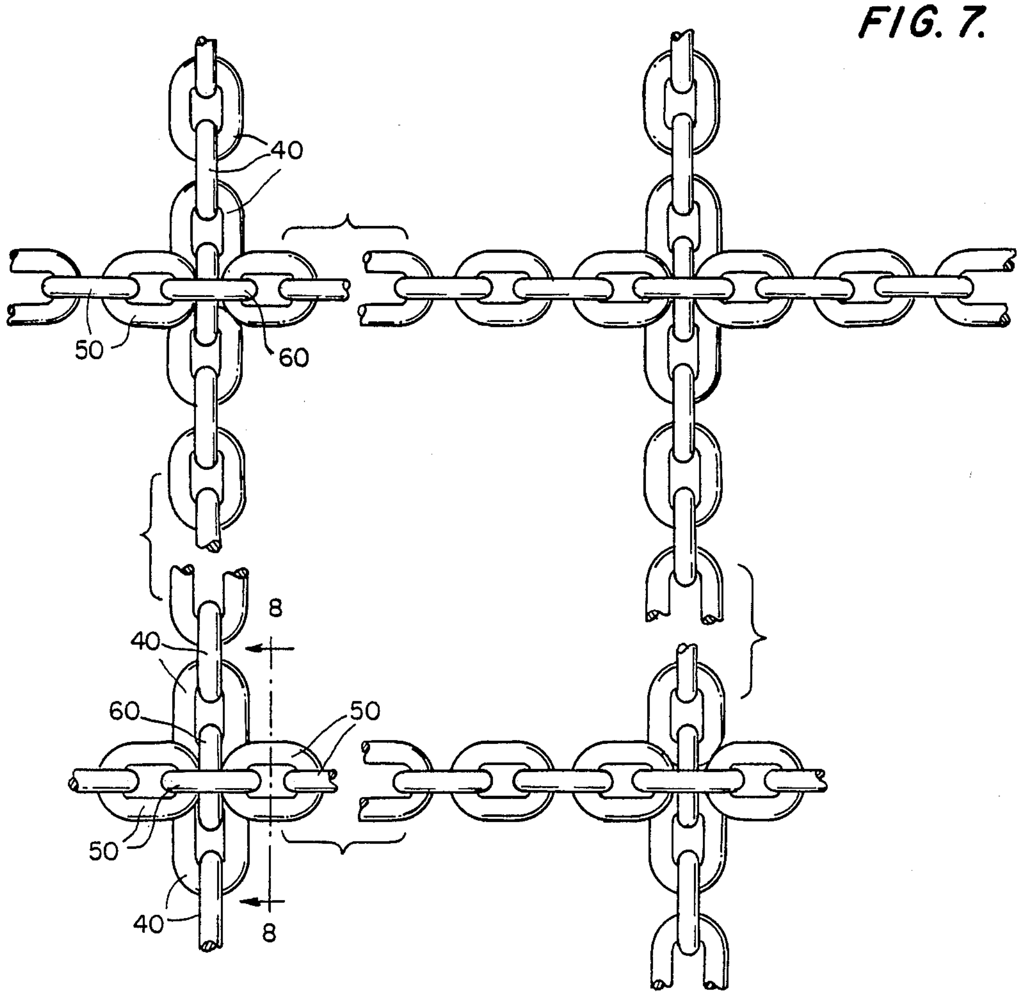
FIG. 7 depicts an enlarged arrangement in detail of the parallel running lengths of chain with crossing connections.
Figure 12:
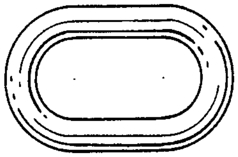
FIG. 12 is a view of a chain link per se.

FIG. 7 shows in enlarged detail the interconnecting of the plurality of crossed parallel vertical and horizontal running lengths of chain. Each chain link 40 per se of the vertical chains interconnects with adjacent links above and below it and the vertical chains have the plurality of chain links 50 of the horizontal chains crossing therewith. The chain links 40 and the chain links 50 are shown per se in FIG. 12.

Figure 8:
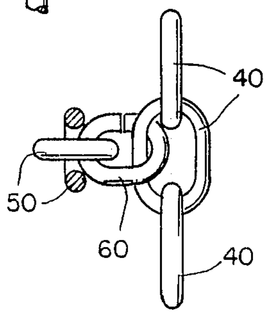
FIG. 8 is a cross-sectional view, taken generally along line 8—8 of FIG. 7.
Figure 13:
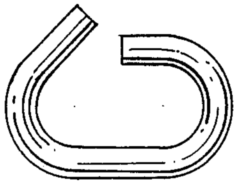
FIG. 13 is a view of a connecting link per se.

FIG. 13 shows per se the structure of a connecting link 60. Normally, each connecting link is open as shown and only after installation thereof is this link clinched into a closed configuration. The cross-section of FIG. 8 shows clearly how each connecting link 60 interconnects between respective links 40 and 50 of the vertical and horizontal chains.

Figure 9:
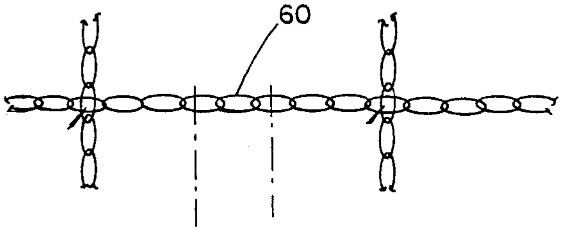
FIG. 9 is a sectional view showing how two of the mesh panels of FIG. 1 are joined together.
Figure 10:
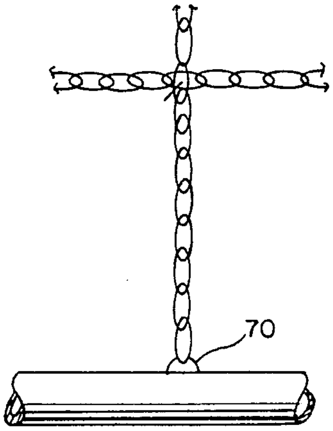
FIG. 10 is a detailed view of the end connections to a support pipe for the vertical chains.

FIG. 9 shows in detail connecting splice links between one mesh panel on the left and another mesh panel on the right. In the embodiment shown three links are provided from the outboard vertical chain of each grid mesh panel, with the adjacent ends of these respective three links being connected by a connecting link 60. FIG. 10 shows a half link 70 which is welded to either the top or bottom support pipe for connecting of the vertical chains thereto.

Figure 11:
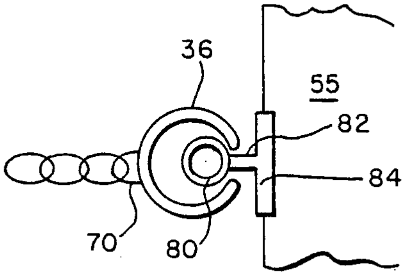
FIG. 11 is a view showing how the ends of horizontal chain lengths are connected to a support pipe.

FIG. 11 shows a half link 70 welded to open support pipe 36 associated with side support structures. In order to permit additional flexibility of the overall installation, the open side support pipes 36 may have a side slit therein so that same can ride upon inner support pipe 80 permanently affixed to bracket 82, 84 embedded in side support 55. The structure is similar on both the right and left sides of the overall installation.

Figure 14:
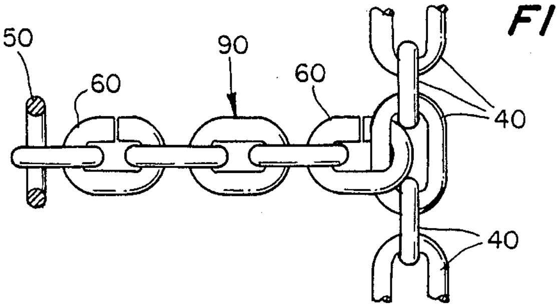
FIG. 14 is a view of a modification in which the connecting means comprises a short length of chain.

FIG. 14 shows a modification in which the connecting means comprises a short length of chain 90 having a connecting link 60 at each end thereof for connecting the links 40 and 50 of the vertical and horizontal chains, respectively.

In normal installation an important advantage of the chain mesh disclosed is that it benefits from the full strength of continuous chains in both horizontal and vertical directions. This is in comparison to having continuous chains in only one direction and short, less strong, lengths in the other direction, which is quite common in known installations.

In the application shown in the drawing figures, the vertical chain lengths for each mesh panel are typically installed first between the upper support bridge structure and the lower anchor blocks by use of the upper and lower support pipes. After the vertical chains have been installed, the horizontal chain lengths are connected to them by use of connecting links at the crossing points, as best depicted in FIGS. 7 and 8.

Chain mesh according to the invention can take any of numerous configurations. All configurations, however, are characterized by having sites at which a first running length crosses at least one other adjacent running length which is non-parallel to the first. Although the most common configurations include only two running lengths at each crossing site, in some mesh designs three or more non-parallel running lengths could cross each other at each site.

Installation of a barrier using chain mesh according to the invention is fairly quick and easy and the mesh itself is quite flexible, so that chain mesh according to the invention can be utilized in many applications requiring flexible barrier. Such applications can range from light duty mesh for doors in shopping malls to heavy duty mesh made from very large chain links and used as underwater barrier nets for preventing access to a site, such as by submarines. In addition to the barrier type applications, the chain mesh of the present invention is also suitable for cargo nets, boarding nets, blasting nets, and similar applications.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the appended claims.

We claim:

1. A chain mesh, comprising:

a plurality of running lengths of chain, the running lengths being so positioned that at least a first running length crosses and is adjacent to a second running length at a crossing site, said running lengths being disposed in different planes in overlapping relationship with one another at least at the crossing site; and separate connecting means between and connected to both the first and second running lengths at the crossing site so as to flexibly maintain the first and second running lengths in close but spatially separate relationship to one another at the crossing site, said connecting means comprising a short length of chain having a link at each end engaged in a respective link of the first and second running lengths.

2. A chain mesh, comprising:

a first series of parallel running lengths of chain;

a second series of parallel running lengths of chain adjacent but non-parallel to the first series, both series being so positioned that each running length of each series crosses in overlapping relationship two or more running lengths of the other series at crossing sites; and separate connecting means between and connected to running lengths of both series at the crossing sites so as to flexibly maintain the first and second running lengths in close but spatially separate relationship to one another at the crossing site, said connecting means each comprising a a short length of chain having a link at each end engaged in a respective link of the first and second series.

* * * * *